(No Model.)

J. W. NEFF.
LINE CHALKING DEVICE.

No. 526,937. Patented Oct. 2, 1894.

WITNESSES:
Fred G. Dieterich
Henry J. Robinson

INVENTOR
John W. Neff.
BY Munn & Co
ATTORNEYS.

THE NORRIS PETERS CO., PHOTO-LITHO., WASHINGTON, D. C.

UNITED STATES PATENT OFFICE.

JOHN W. NEFF, OF BUCKHANNON, WEST VIRGINIA.

LINE-CHALKING DEVICE.

SPECIFICATION forming part of Letters Patent No. 526,937, dated October 2, 1894.

Application filed April 16, 1894. Serial No. 507,781. (No model.)

*To all whom it may concern:*

Be it known that I, JOHN W. NEFF, residing at Buckhannon, in the county of Upshur and State of West Virginia, have invented a new and Improved Line-Chalking Device, of which the following is a specification.

My invention is in the nature of a combined chalk line reel and chalker, for carpenters' uses, and it primarily has for its object to provide a simple and inexpensive device of this kind which will effectively, and in a simple manner accomplish the desired purpose.

It has also for its object to provide a device of this kind which can be easily manipulated, which, while serving as a holding reel for the cord will also serve as a line fastener or securer to hold the line after it is chalked, at any desired point from which the mark is to be made.

With other minor objects in view and which hereinafter will be referred to the invention consists in such peculiar combination and novel arrangement of parts, such as will be first described in detail and then be specifically pointed out in the appended claims, reference being had to the accompanying drawings, in which—

Figure 1:
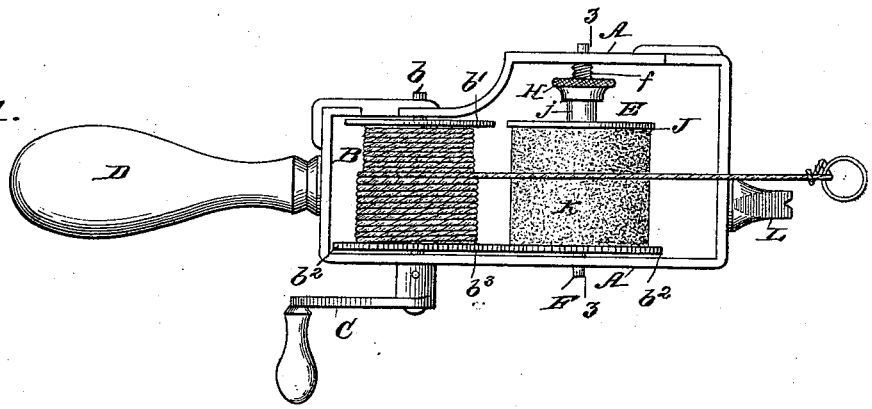
Figure 2:
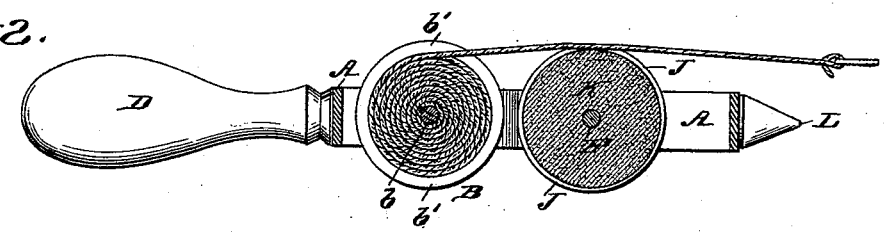
Figure 3:
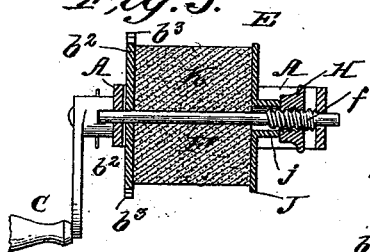
Figure 4:
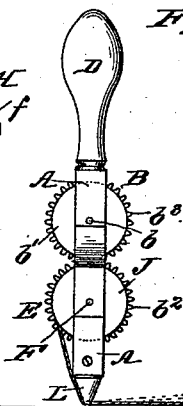

Figure 1 is a plan view of my improved line holding and chalking device. Fig. 2 is a longitudinal section thereof. Fig. 3 is a transverse section of the same on the line 3—3 Fig. 1, and Fig. 4 is a side view of the same in position for holding the line to a desired point.

My improved device comprises essentially a rectangular frame having at one end a handle, and having journaled therein a line reel and a chalk holding reel or shaft, which reels are geared to operate together, and are operated by a crank secured to the line reel shaft.

Referring to the accompanying drawings by letter, A indicates the frame formed preferably of two sections secured together by screws, whereby the reel shaft can the more conveniently be journaled therein. This frame it will be noticed, is somewhat contracted at its rear end and in such contracted portion is journaled a line reel B, formed of a shaft $b$, and end disks $b'$ $b^2$, one of which, $b^2$, has a toothed periphery $b^3$. One end of the shaft $b$ is projected and has secured thereto a crank member C as shown.

D indicates a handle member secured to the rear end of the frame and E a chalk carrier or reel, which is journaled in front of the reel B, and which comprises a shaft F to which is fixedly connected a toothed member $b^2$. This shaft F has one end threaded as at $f$, on which is fitted a threaded adjusting screw H, which is held to bear against the hub $j$, of disk member J held to slide on the shaft as most clearly shown in Fig. 3.

K indicates a piece of chalk centrally apertured and fitted on the shaft F, which is held pressed together against the disk member $b^2$, by the member J and screw H. At the front end of the frame is a notched projection L which forms a means for holding the line to a fixed point after being chalked as will be presently more fully described.

By referring to Fig. 1 the manner in which my improved device operates will be most clearly understood, and such operation is best explained as follows: The free end of the line is made fast, and passed over the chalk, such line being wound on the reel in the manner shown. The operator holding the device in his left hand, bears the chalk against the line and unwinds the reel, keeping the line in contact with the chalk. After the desired length of line has been chalked, the device is turned to a position shown in Fig. 4, when the notched member L, bears against the line and holds the inner end while the operator snaps the same.

By providing a slidable clamp member the chalk portion can be the more securely held in place and clamped after it becomes worn.

Having thus described my invention, what I claim, and desire to secure by Letters Patent, is—

1. A combined line holder and chalker, comprising a supporting frame, having a longitudinally rearwardly projecting handle, a line reel journaled transversely in such frame adjacent the handle end, and a chalk holding reel journaled in front of and parallel to the reel shaft, all arranged substantially as shown whereby after the free end of the line is fastened, by grasping the handle and bearing the chalk against the line, such line will be chalked as it is reeled out as specified.

2. As an improvement in line holders and chalkers, in combination with line holding and chalking means substantially as shown, of a supporting frame therefor, having a handle at one end, and a notched projection at the other end, all arranged substantially as shown and for the purposes described.

3. An improved chalk line holder and chalker, comprising a main frame having a longitudinally rearwardly extending handle, line holding means supported in such frame arranged to feed the line longitudinally outward from the handle end, and a longitudinal forward projecting notched member on the front end of the frame as and for the purposes specified.

4. An improved chalk line holder and chalker, comprising a supporting frame, a line reel journaled transversely in the rear end thereof, a handle member projected rearwardly from such end of the frame, said reel having an outwardly projecting crank handle, a chalk holding reel journaled in front of and parallel with the line reel, and a notched member projected forward from the chalk reel end of the frame all arranged substantially as shown and described.

5. An improved chalk line holder and chalker, consisting of a main frame having a hand hold at one end, a line reel journaled in such end having an operating crank handle and the opposite end having a notched projection, said reel having a toothed disk, a chalk holding shaft journaled with the line reel, said shaft having a fixed toothed disk geared with the line reel toothed disk, and a threaded section, a chalk disk loosely held on the shaft, a presser disk loosely held on such shaft and an adjustable thumb screw on the threaded end of such shaft all arranged substantially as shown and for the purposes described.

6. An improved chalk line holder and chalker comprising a frame, having a projecting handle at one end, a line reel journaled transversely in the frame at the handle end, having its shaft projected at one side and provided with a crank handle, a chalk reel journaled in front of and parallel with the line reel, and gear mechanism connecting such line and chalk reels whereby the chalk will be rotated reversely to the feed of the line, substantially as shown and described.

JOHN W. NEFF.

Witnesses:
J. J. NEWLON,
A. J. BOREMAN, Jr.